(12) United States Patent
Tulino et al.

(10) Patent No.: US 8,811,246 B2
(45) Date of Patent: Aug. 19, 2014

(54) WIRELESS COMMUNICATION SYSTEMS, RELAY SYSTEMS AND METHODS OF RELAYING DATA

(75) Inventors: Antonia Tulino, Lincroft, NJ (US); Gerard Foschini, South Amboy, NJ (US); Reinaldo A. Valenzuela, Holmdel, NJ (US)

(73) Assignee: Alcatel Lucent, Paris (FR)

( * ) Notice: Subject to any disclaimer, the term of this patent is extended or adjusted under 35 U.S.C. 154(b) by 163 days.

(21) Appl. No.: 13/350,364

(22) Filed: Jan. 13, 2012

(65) Prior Publication Data

US 2013/0182634 A1 Jul. 18, 2013

(51) Int. Cl.
*H04B 7/00* (2006.01)
*H04B 1/60* (2006.01)
*H04B 17/02* (2006.01)

(52) U.S. Cl.
USPC ............ 370/310.2; 370/310; 370/315; 455/7; 455/10; 455/15; 455/25

(58) Field of Classification Search
CPC .................................................... H04L 1/0077
USPC .......... 370/310, 310.2, 315; 455/7, 10, 15, 25
See application file for complete search history.

(56) References Cited

U.S. PATENT DOCUMENTS

| | | | | |
|---|---|---|---|---|
| 2004/0102219 | A1* | 5/2004 | Bunton et al. ................ | 455/560 |
| 2008/0175183 | A1* | 7/2008 | Devroye et al. ............... | 370/315 |
| 2008/0240054 | A1 | 10/2008 | Sandhu et al. | |
| 2008/0260000 | A1* | 10/2008 | Periyalwar et al. ........... | 375/133 |
| 2009/0270028 | A1* | 10/2009 | Khojastepour et al. ........ | 455/24 |
| 2011/0064018 | A1 | 3/2011 | Hottinen | |
| 2013/0034129 | A1* | 2/2013 | Coldrey et al. ................ | 375/211 |

FOREIGN PATENT DOCUMENTS

WO WO 2009/102906 8/2009

OTHER PUBLICATIONS

A. Y. Panah, K. T. Truong, S. W. Peters and R. W. Heath Jr, "Interference management schemes for the shared relay concept" EURASIP J. Adv. Signal Process., vol. 2011, pp. 1-14, 2010.*
R1-091423, Comparison of Type 1 Relay and L2 Cooperative Relay, Source: ZTE, TSG-RAN WG1 #56bis, Seoul, Korea, Mar. 23-Mar. 27, 2009, pp. 1-10.*
Y. Song, H. Yang, J. Liu, L. Cai, D. Li, X. Zhu, K. Wu, and H. Liu, "Relay station shared by multiple base stations for inter-cell interference mitigation," IEEE C802.16m-08/1436r1, Nov. 2008.*
J. Kim, J. Hwang, and Y. Han, "Joint processing in multi-cell coordinated shared relay network," in Proc. IEEE Int. Symp. Personal, Indoor and Mobile Radio Commun. (PIMRC), Sep. 2010, pp. 702-706.*

(Continued)

*Primary Examiner* — Ayaz Sheikh
*Assistant Examiner* — Tarell Hampton
(74) *Attorney, Agent, or Firm* — Harness, Dickey & Pierce, P.L.C.

(57) ABSTRACT

A wireless communication system includes at least one first relay configured to forward data received from at least one of a plurality of base stations, and to reduce intra-cell interference between a plurality of sectors of the plurality of base stations.

15 Claims, 11 Drawing Sheets

(56) References Cited

OTHER PUBLICATIONS

Chen, W. et al., "A New Relay Architecture for Interference Management and Capacity Enhancement," 2011 7$^{th}$ International Conference on Wireless Communications, Networking and Mobile Computing (WICOM), pp. 1-5, Sep. 23, 2011.

Peters, S. et al., "Relay Architecture for 3GPP LTE-Advanced," EURASIP Journal on Wireless Communications and Networking 2009, pp. 1-16, Jul. 13, 2009.

International Search Report and Written Opinion dated Apr. 12, 2013.

\* cited by examiner

WIRELESS COMMUNICATION SYSTEMS, RELAY SYSTEMS AND METHODS OF RELAYING DATA

BACKGROUND

1. Field

Example embodiments of the present invention relate generally to wireless communication systems including relay nodes.

2. Description of the Related Art

While cellular networks are ubiquitous, users continue to experience inconsistent and unpredictable performance in mobile applications. While performance degradation may be a result of network congestion or an obstructed path of a wireless signal, in any cellular deployment performance may degrade towards the edge of a cell due to interference from, for example, neighboring cells. Data transfer rates at the edge of the cell (cell edge rates) are typically the worst transfer rates for the cell.

Some wireless networks include relay nodes (RN) which work in conjunction with base stations (BS), for example extended node Bs (enB), to extend the coverage of the BSs and improve cell edge rates. One type of RN is the type II RN defined by 3GPP documents for LTE-Advanced technology.

A simple example of downlink operation of a type II relay, integrated into a hybrid automatic repeat request (HARQ) operation is described as follows. An eNB sends a transport block to a UE and RN. The RN may successfully decode the transport block, while the UE fails to decode the transport block. The RN retransmits the transport block at some later time, possibly simultaneously with eNB, and the UE receives the transport block correctly because the channel quality on the RN-UE link is significantly better than on the eNB-UE link. Accordingly, the manner in which RNs are used in wireless networks to supplement the wireless coverage of BSs can improve the quality of service experienced by UEs in a wireless network.

Defining a method or architecture for operating relay-aided cellular networks is a difficult problem and signaling schemes are not known even for a simple case of a single source, relay and destination. Furthermore, only upper bounds on the capacity region are available even for this simple case.

Current solutions for improving cellular network throughput and edge rates in cellular networks using relays include independently scheduling users and relays, and/or increasing the density of served users on a one time frequency slot. One method of increasing the density of served users includes adding infrastructure in so-called cell-splitting schemes (e.g., micro or pico cells).

SUMMARY

At least one example embodiment includes a wireless communication system. According to an example embodiment, a wireless communication system includes at least one first relay configured to forward data received from at least one of a plurality of base stations, and to reduce intra-cell interference between a plurality of sectors of the plurality of base stations.

According to an example embodiment, a wireless communication system includes a plurality of relays uniformly distributed in a circular pattern at a distance from a base station, the distance being about half a radial distance between the base station and an outer border of at least one of a plurality of sectors of the base station.

At least one example embodiment includes a relay system. According to an example embodiment, a relay system includes at least one relay configured to connect to at least one of a plurality of base stations, the first relay configured to forward data received from the at least one of the base stations and to reduce intra-cell interference between a plurality of adjacent sectors, each of the adjacent sectors corresponding to a different one of the plurality of base stations.

At least one example embodiment includes a method of relaying data. According to an example embodiment, a method of relaying data includes positioning a relay between a plurality of base stations with a plurality of sectors such that the relay forwards data and reduces intra-cell interference between the plurality of sectors.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

A relay as used herein may be infrastructure equipment that assists in conveying signals between, for example, a base station and a mobile station. The relay may be wirelessly connected to a fixed network. In some example embodiments, the relay may be connected to the fixed network by only a wireless connection.

For purposes of explanation only, example embodiments may be described with respect to fixed conditions and parameters. However, example embodiments are not so limited and one of ordinary skill in the art in possession of the Applicants' disclosure would understand example embodiments to be applicable to other conditions or parameters.

For example, the following conditions and/or parameters may be assumed with respect to evaluation of architecture performance. A wireless communication system may include 19 3-sector base stations with wrap around, serving either one or multiple users per sector at any one time and frequency. A mobile station may associate (e.g., always associate) with the base having the least propagation loss. The total power per base station may be constant and may determine the reference signal-to-noise ratio (SNR) at a 3-sector vertex. The sectors may have 70 degree full-width-half-power (FWHP). Architecture radio wave propagation may be determined using a COST 231-Hata model. The carrier frequency may be 2 GHz ($f_c=2$ GHz) and bandwidth may be 10 MHz. Cell radius may be 1000 m, base height may be 30 m, relay height may be 15 m, a mobile station antenna height may be 1 m, shadowing on the link base-relay may be 6 dB and shadowing on the links base-user and relay-user may be 8 dB. Wireless communication systems may be down link, half duplex relay assisted networks.

Figure 1:
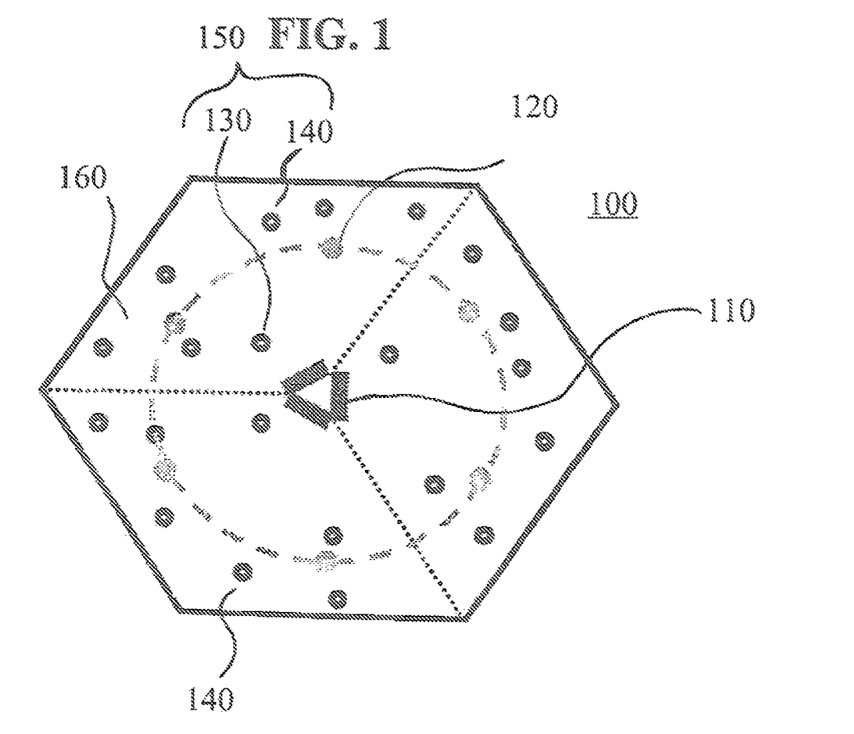
FIG. 1 is a block diagram illustrating a wireless communication architecture according to an example embodiment.

FIG. 1 is a block diagram illustrating a wireless communication architecture according to an example embodiment. Referring to FIG. 1, a cell 100 of a wireless communication system may include a base station 110 and relays 120. The relays 120 and base station 110 may serve mobile stations 150, including inner mobile stations 130 and outer mobile stations 140. The cell 100 may be divided into, for example, 3 sectors 160.

The base station 110 may be, for example, an 18 antenna base station with 6 antennas per sector. Each of the base station antennas may be 120 degree antennas. The relays 120 may be, for example, 6 3-antenna omnidirectional relays evenly distributed in a circular pattern around the base station 110. The relays 120 may be positioned, for example, at a distance from the base station 110 of about half a radial distance of the cell 100 in any given direction.

According to at least one example embodiment, the relays 120 may be positioned uniformly on a circle of one half the cell radius such that there are 2 relays 120 in each sector 160. For example, a radius of a cell may be 1000 m with an SNR at the end of the cell at 18 dB and a halfway point at 500 m with SNR around 30 dB. According to at least one example embodiment, a radius may be determined according to SNR.

Each sector 160 may, for example, include 6 antennas and serve 7 mobile stations, one from the base station 110 and three per relay 120. Mobile stations 150 may be assigned to the base station 110 or a relay 120 based on the least propagation loss (not including shadowing).

The architecture of FIG. 1 may only require full knowledge of base-to-relay links. No-knowledge of base-to-user and relay-to-user links in terms on amplitude and phase may be required. Only the signal-to-noise ratio (SNR) for each of such links may be assumed at the transmitters. A non-collaborative scheme may be employed, although example embodiments are not so limited and a collaborative scheme may be employed.

Figure 2:
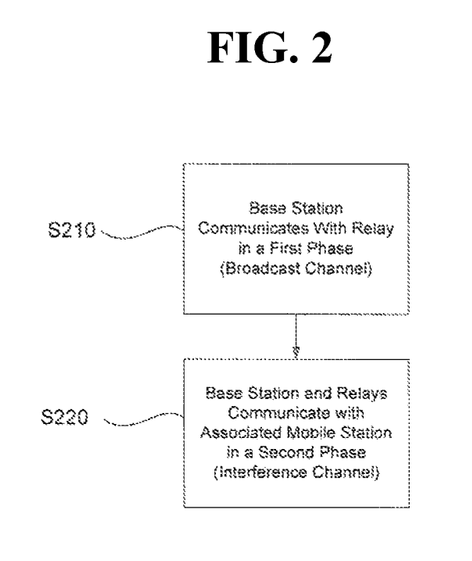
FIG. 2 is a flow chart illustrating two phase communications within the wireless architecture of FIG. 1.

FIG. 2 is a flow chart illustrating two phase communications within the wireless architecture of FIG. 1. Referring to FIG. 2, the base station 110 may communicate with the relays 120 in a first phase (S210) and both the relays 120 and the base station 110 may communicate with the mobile stations 150 in a second phase.

The first phase may be a broadcast channel in which the mobile stations 150 may not be active. The base station 110 may transmit messages being passed to the mobile stations associated with each of the relays 120 using, for example, Dirty paper coding and/or Optimal Linear Pre coding.

The base station 110 may use knowledge of a link between the base station and each relay 120. Transmissions from other base stations may be treated as interference. The base station 110 may be knowledgeable of channel state information (CSI) of the base station to relay channels within the cell 100. For example, the base station 110 may have perfect knowledge of the channels with its subordinate relays 120. In the case of Dirty Paper Coding, denoting by $\pi$ the encoding ordering assumed at the base station, the $i^{th}$ 3-antenna relay may receive 3 independent streams at a total rate according to Formula 1.

$$R_{SR}^{(i)} = \log\left(I + H_{SR}^{(i)} P_i H_{SR}^{(i)\dagger}\left((1 + i_{out})I + \sum_{j>\pi(i)}^{6} H_{SR}^{(i)} P_j H_{SR}^{(i)\dagger}\right)^{-1}\right) \quad \text{[Formula 1]}$$

In Formula 1, $H_{SR}^{(i)}$ is 3×18 random matrix modeling of the channel between the 18-antenna base station and the $i^{th}$ 3-antenna relay, I is the identity matrix, $P_j$ with $j=1, \ldots, 6$ is the pre-coding matrix obtained by, for example, convex optimization.

The base station 110 and the relays 150 may communicate with associated mobile stations 150 in a second phase (S220). The second phase may be an interference channel. In the second phase, only the signal-to-noise ratio (SNR) for each link may be assumed at the transmitters. No channel knowledge may be assumed at the transmitters and one message may be assigned per antenna. Where three mobile stations 150 are associated to each of the relays 120, the total throughput conveyed from a relay 120 to the 3 associated mobile stations 150 may be given by Formula 2.

$$\min\left\{\sum_{n=1}^{3} \log\left(1 + \frac{P_{i,n}\|h_{RU}^{(i,n)}\|^2}{1 - (P - P_{i,n})\sum_{j \neq n}\|h_{RU}^{(i,n)}\|^2 + i_{out}}\right), R_{SR}^{(i)}\right\} \quad \text{[Formula 2]}$$

The total throughput transferred from the base station to its associated inner mobile stations 130 may be given by Formula 3.

$$\sum_{n=1}^{3} \log\left(1 + \frac{P_{s,n}\|h_{SU}^{(S,n)}\|^2}{1 + i_{out}}\right) \quad \text{[Formula 3]}$$

In Formula 3, $P_{S,n}$ and $P_{R,n}$ are transmitting powers allocated to the $n^{th}$ mobile station by the source and by the $i^{th}$ relay 120, respectively, $h_{SU}^{(S,n)}$ is a 6-dimensional random vector modeling the channel between the 6 transmitting antennas of an $n^{th}$ sector of the base station and the associated user with n=1, ... 3, and $h_{RU}^{(i,n)}$ is a 3-dimensional random vector modeling channel vectors from the $i^{th}$ relay to its associated mobile stations.

Figure 3:
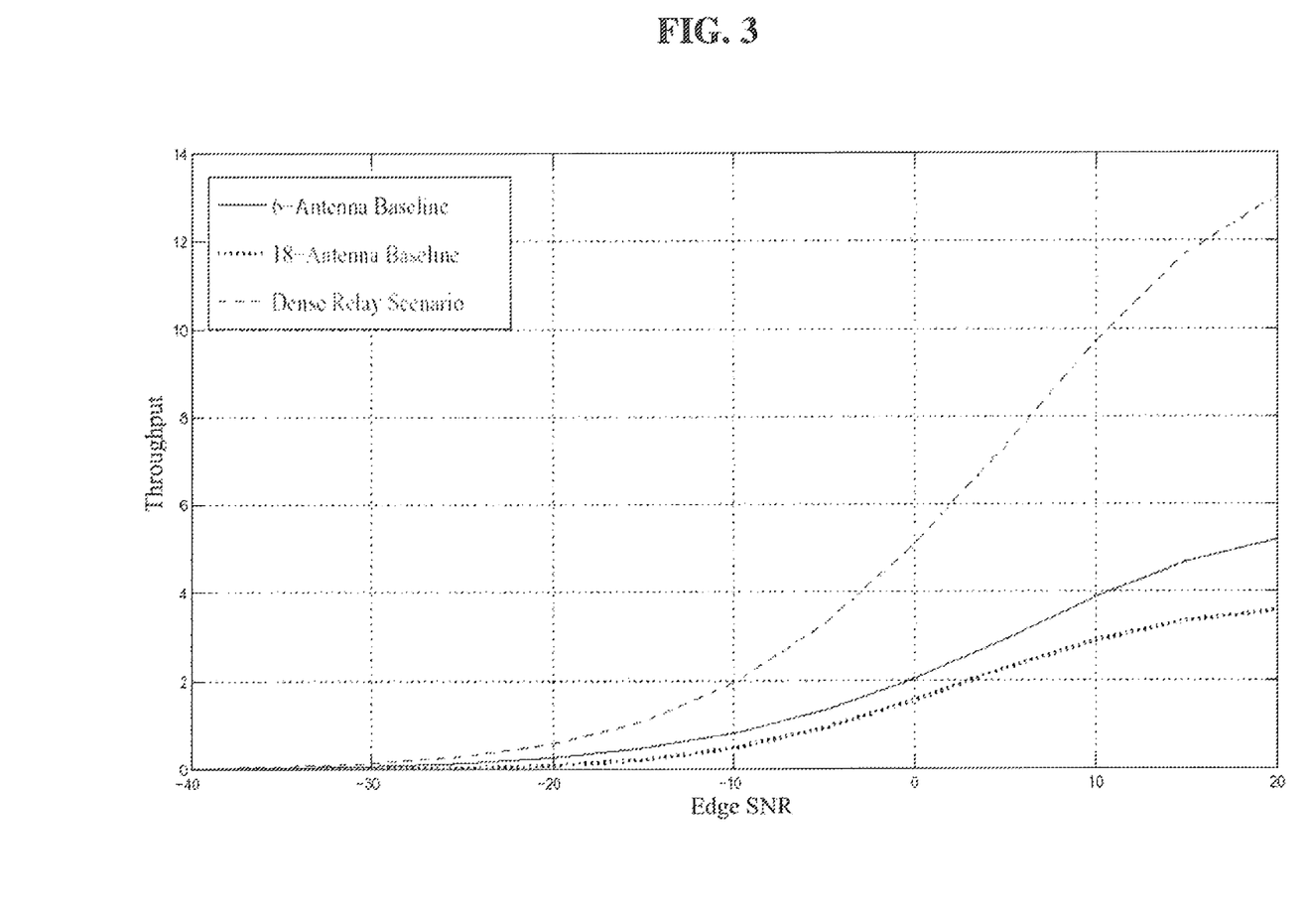
FIG. 3. is a graph of average throughput as a function of edge signal-to-noise ratio (SNR) for two baselines and the architecture described with respect to FIGS. 1 and 2.

FIG. 3. is a graph of average throughput as a function of signal-to-noise ratio (SNR) for two no-relay baselines and the architecture described with respect to FIGS. 1 and 2. A first baseline architecture (6-Antenna Baseline) includes a 6-sector base station with 3 antennas and 1 mobile station per sector (6 mobile stations per base). The first baseline is represented by a solid curve in FIG. 3. A second baseline architecture includes a 6-sector base station with 3 antennas and 3 mobile stations per sector (18 mobile stations per base). The second baseline is represented by a dotted curve in FIG. 3. The architecture according to example embodiments and described with respect to FIGS. 1 and 2 (dense relay scenario) is represented by a dashed curve in FIG. 3. Referring to FIG. 3, a 150% throughput gain may be achieved at 10 dB signal-to-noise ratio (SNR) over the baselines.

Figure 4:
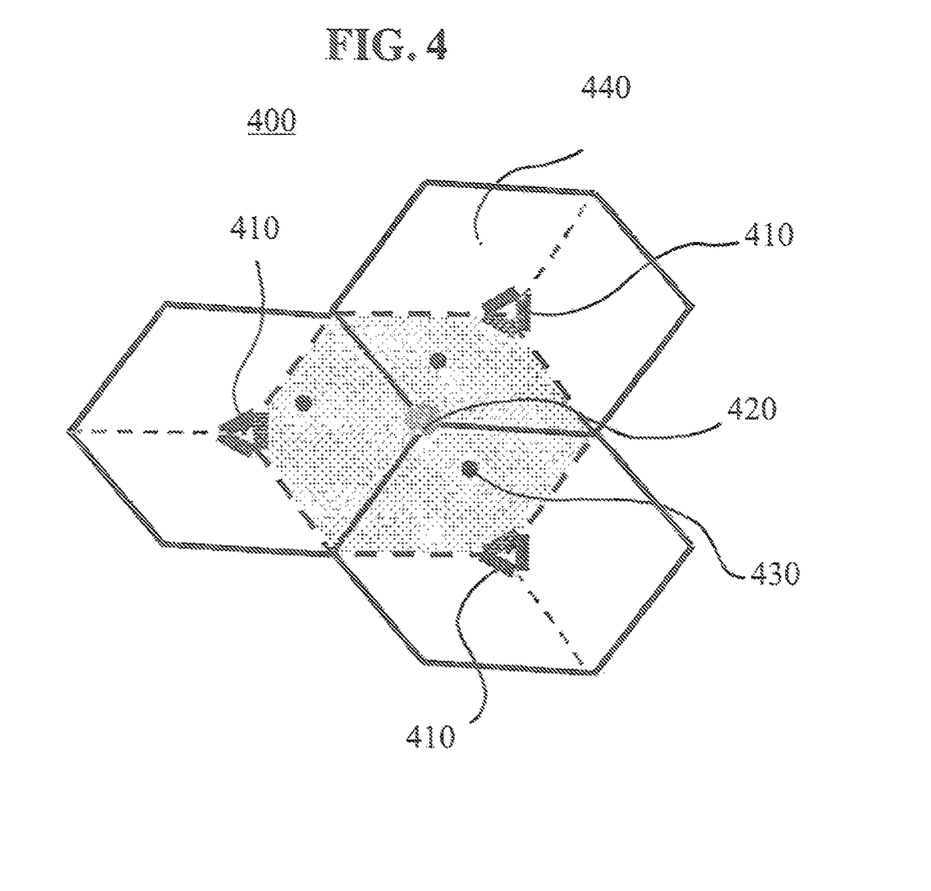
FIG. 4 is a block diagram illustrating a wireless communication architecture according to another example embodiment.

FIG. 4 is a block diagram illustrating a wireless communication architecture according to another example embodiment. Referring to FIG. 4, a cluster 400 of a wireless communication system may include base stations 410 and a relay 420. The relay 420 and base stations 410 may serve mobile stations 430. The cluster 400 may be divided into, for example, 9 sectors 440 and may include a 3-sector vertex. The 3-sector vertex may be a convergence of 3 sectors (shaded sectors). One sector 440 of the 3-sector vertex may be associated to each base station 410.

The base stations 410 may be, for example, 3-antenna base stations with 1 antenna per sector 440. Each of the base station antennas may be 120 degree antennas. The relay 420 may be, for example, a 3-antenna omnidirectional relay positioned at the 3-sector vertex. Each of the sectors 440 may only serve one user in a time and frequency resource such that a cluster 400 of a wireless communication system may serve 3 users at a given frequency and time.

The architecture of FIG. 4 may require knowledge (e.g., full knowledge) of the links between the relay 420 and mobile stations 430 at the relay but may not require knowledge of the links between the base stations 410 and the relay 420, and between the base stations 410 and the mobile stations 430. The relaying strategy of the architecture according to example embodiments described with respect to FIG. 4 may be a non-collaborative Decode and Forward relay strategy, although example embodiments are not so limited and other strategies may be employed.

Figure 5:
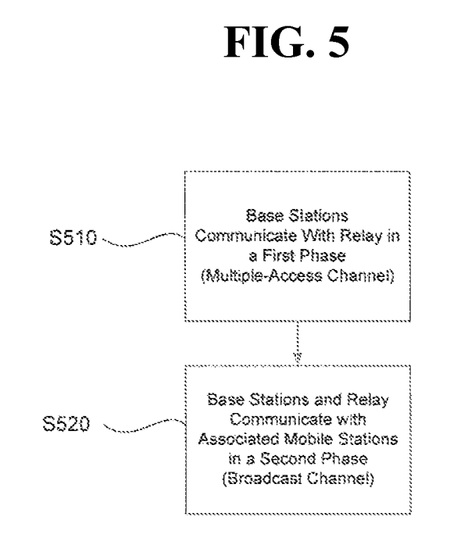
FIG. 5 is a flow chart illustrating two phase communications within the wireless architecture of FIG. 4.

FIG. 5 is a flow chart illustrating two phase communications within the wireless architecture of FIG. 4. Referring to FIG. 5, the base stations 410 may communicate with the relay 420 in a first phase (S510) and relay 420 may communicate with the mobile stations 430 in a second phase (S520). If there is a second mobile station 430 in a sector 440 associated with a base station 410, the second mobile station 430 may receive information directly from the associated base station 410 in the second phase.

The first phase (S510) may be a multiple access channel in which the mobile stations 430 may not be active. The base stations 410 may transmit messages being passed to the mobile stations associated with the relay 420. The relays 420 may decode the messages in the first phase. The first phase may be implemented as, for example, successive interference cancellation (SIC) decoding and/or minimum mean squared error beamforming (MMSE-BF). In the case that a minimum mean squared error beamforming (MMSE-BF) receiver is employed, the message sent by the $i^{th}$ base station may be received at a rate according to Formula 4.

$$R_{SR}^{(i)} = \log\left(1 + \left[H'_{SR}\left(H_{SR}H'_{SR} + \frac{\sigma_n^2}{P_{S,R}}I\right)^{-1}H'_{SR}\right]_{ii}\right) \quad \text{[Formula 4]}$$

In Formula 4, $H_{SR}$ is a 3×3 matrix modeling the channel between the three base stations and the 3-antenna relay, I is the identity matrix and $P_{S,R}$ is the transmission power.

The relay 420 may communicate with associated mobile stations 430 in a second phase (S520). The second phase may be a broadcast channel (BC). The second phase may be accomplished by, for example, zero-forcing beam-forming (ZF-BF) where the full knowledge of the links between relays and users may be required in order to spatially orthogonalize the mobile stations 430 and allocate power (e.g., optimally allocate power). In the second phase, transmission times may be assumed to be equal. The relay beam forming vector for the $i^{th}$ user may be determined from Formula 5.

$$\tilde{v}_{RU}^{(i)} = \frac{v_{RU}^{(i)}}{\|v_{RU}^{(i)}\|}, v_{RU}^{(i)} = \left(I - H_{RU}^{(i)}\left(H_{RU}^{(i)\dagger}H_{RU}^{(i)}\right)^{-1}H_{RU}^{(i)\dagger}\right)h_{RU}^{(i)} \quad \text{[Formula 5]}$$

In Formula 5, $h_{RU}^{(i)}$ is a 3-dimensional vector modeling the channel between the relay and the $i^{th}$ user, $H_{RU}=[h_{RU}^{(1)}, \ldots h_{RU}^{(3)}]$, and $H_{RU}^{(i)}$ is a 3×2 dimensional submatrix obtained from $H_{RU}$ deleting the $i^{th}$ column. Because the first and second phase rates must be the same for a given user, the maximum user rates achieveable in the second phase may be determined (e.g., determined first) by zero-forcing beam-forming (ZF-BF) with optimal power allocation and these may be used to establish the successive interference cancellation (SIC) decoding order for the first phase.

According to example embodiments described with respect to FIGS. 4 and 5, there may be 20% gains in average rate and more than 100% gain in edge (5%) rates over a non-relay case.

Figure 6:
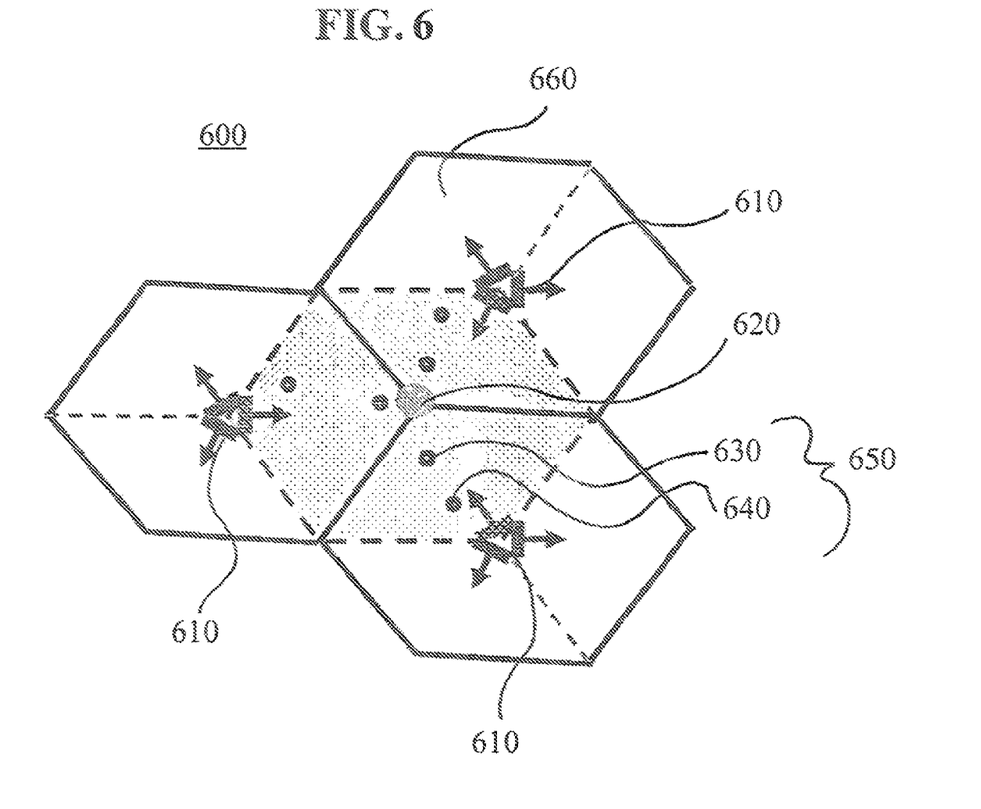
FIG. 6 is a block diagram illustrating a wireless communication architecture according to yet another example embodiment.

FIG. 6 is a block diagram illustrating a wireless communication architecture according to yet another example embodiment. Referring to FIG. 6, a cluster 600 of a wireless communication system may include base stations 610 and a relay 620. The relay 620 and base stations 610 may serve mobile stations 650. The cluster 600 may be divided into, for example, 9 sectors 660 and may include a 3-sector vertex. The 3-sector vertex may be a convergence of 3 sectors (shaded sectors). Each of the 3 converging sectors 660 may be associated to a different base station 610.

The base stations 610 may be, for example, 3-antenna base stations with 1 antenna per sector 660. Each of the base station antennas may be 120 degree antennas. The relay 620 may be, for example, a 6-antenna omnidirectional relay positioned at the three sector vertex. The relay 620 may serve 3 inner mobile stations 630 nearest to the relay 620 while placing a null in a direaction of the mobile stations 640 in each sector. Each of the base stations 610 may serve an outer mobile station 640—outer with respect to the relay 620.

Figure 7:
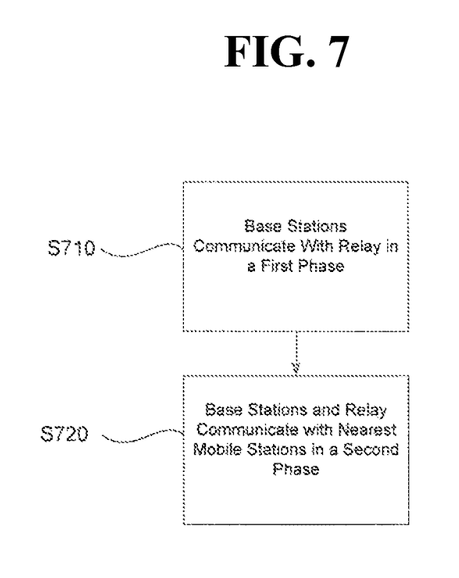
FIG. 7 is a flow chart illustrating two phase communications within the wireless architecture of FIG. 6.

FIG. 7 is a flow chart illustrating two phase communications within the wireless architecture of FIG. 6. Referring to FIG. 7, the base stations 610 may send messages to be relayed to the mobile stations 630 to the relay 620 in a first phase (S710). The relay 620 may communicate with the inner mobile stations 630 and the base stations 610 may communicate with the outer mobile stations 640 in a second phase (S520). In the first phase (S710) the relay 620 may employ zero-forcing beamforming and/or minimum mean squared error beamforming to decode signals transmitted by the base stations 610. The first phase may be the same or similar to the first phase described according to example embodiments illustrated in FIG. 5.

The base stations 610 may communicate directly with an outer mobile station 640 nearest to a corresponding base station 610, and the relay 620 may communicate with the inner mobile stations 630, in a second phase (S720). The relay 620 may use zero-forcing beamforming to retransmit the decoded signals to the inner mobile stations 630. The relay beamforming vector for the $i^{th}$ mobile station may be determined from Formula 6.

$$\hat{v}_{RU}^{(i)} = \frac{v_{RU}^{(i)}}{\|v_{RU}^{(i)}\|} \quad i = 2k+1 \text{ with } k = 0, \ldots 2 \qquad \text{[Formula 6]}$$

$$\hat{v}_{RU}^{(i)} = \left(I - H_{RU}^{(i)}\left(H_{RU}^{(i)\dagger}H_{RU}^{(i)}\right)^{-1}H_{RU}^{(i)\dagger}\right)h_{RU}^{(i)}$$

In Formula 6, $h_{RU}^{(i)}$ is a 6-dimensional vector modeling the channel between the relay and the $i^{th}$ user with i=1, ..., 6, $H_{RU}=[h_{RU}^{(1)}, \ldots, h_{RU}^{(6)}]$, and $H_{RU}^{(i)}$ is a 3×5 dimensional submatrix obtained from $H_{RU}$ deleting the $i^{th}$ column.

The highest and/or improved achievable performance may be obtained by evaluating the optimal (in the sense of a maximizing system with a per base and per relay power constraint) power allocations. The optimization is a constrained waterfilling power allocation on the relay. As an upper bound, the unrealistic case of per-cluster power constraint in which the powers of the bases and the relays within the same coordination cluster can be jointly optimized may be considered. Throughput may be maximized and/or improved with an iterative solution of a sequence of geometric programs. A 19-base system performance may be evaluated by optimizing powers while ignoring the out-of-cluster interference. The achievable rates may be computed taking full account of the optimized powers.

Figure 8:
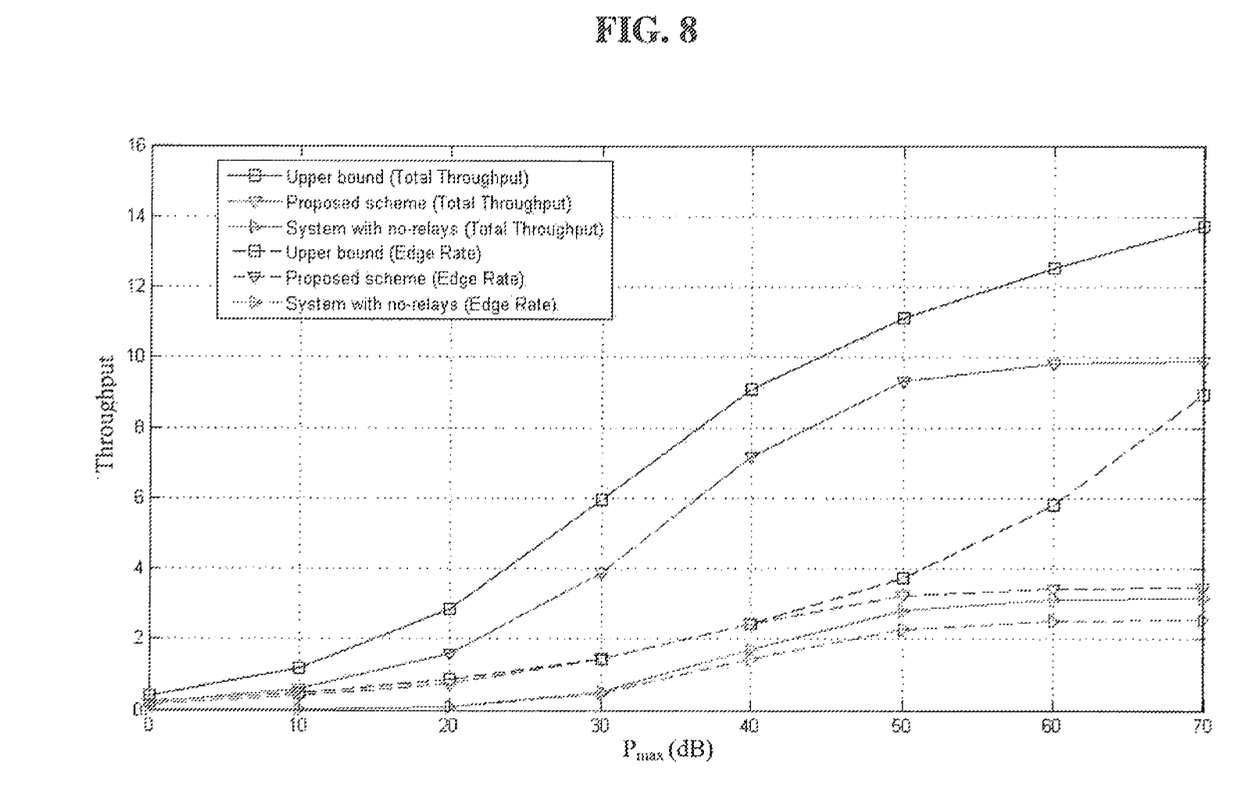
FIG. 8. is a graph of total and edge (10%) mobile station throughput of one cluster as a function of power constraint for a 19 cluster wireless communication architecture.

FIG. 8. is a graph of total and edge (10%) mobile station throughput of one cluster as a function of power constraint for a 19 cluster wireless communication architecture. FIG. 8 illustrates performance of a comparative no-relay wireless communication architecture where users are assigned to the base station according to the highest average signal-to-noise ratio and each base station serves two users in two orthogonal time slots.

Both the upper bound and a scheme according to example embodiments may provide significant gains in throughput as compared to the non-relay case, as illustrated in FIG. 8. At high signal-to-noise ration (SNR) (interference limited case) the relay cases may achieve 14 bps and 9.5 bps/Hz with and without collaboration, respectively, while the non-relay case achieves about 4 bps/Hz. The edge user rate with the collaborative scheme may be 12 bps/Hz while only 3 bps/Hz for both the non collaborative and the baseline cases.

Figure 9:
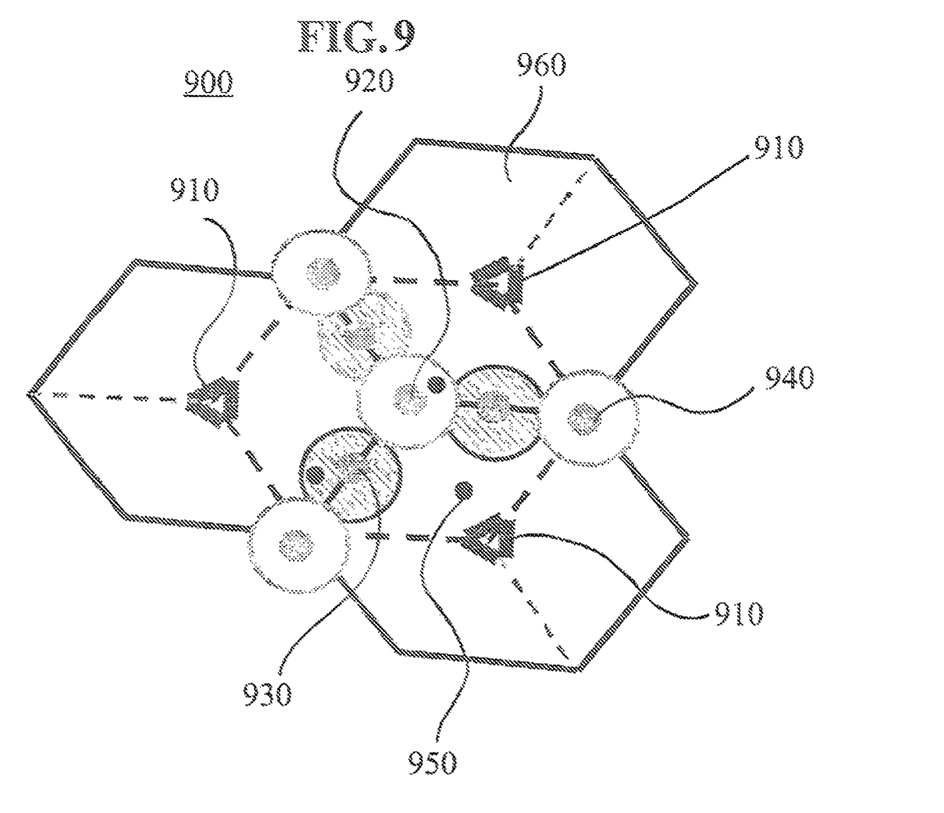
FIG. 9 is a block diagram illustrating a wireless communication architecture according to a further example embodiment.

FIG. 9 is a block diagram illustrating a wireless communication architecture according to a further example embodiment. Referring to FIG. 9, a cluster 900 of a wireless communication system may include base stations 910, 1 relay 920, 3 relays 930 and 3 relays 940. The relays 920 and the relays 940 may be at different 3-sector vertices, and the relays 930 may be on borders of two sectors 960 between the relay 920 and the relays 940.

The cluster 900 may be divided into, for example, 9 sectors 960 and may include a 3-sector vertex. The 3-sector vertex may be a convergence of 3 sectors 960 (shaded sectors), one of the 3 sectors 960 associated to each base station 910. The cluster 900 may be, for example, an extension of the cluster 600 according to at least one example embodiment.

The base stations 910 may be, for example, 3-antenna base stations with 1 antenna per sector 960. Each of the base station antennas may be, for example, 120 degree antennas. The relays 920-940 may be, for example, 6-antenna omnidirectional relays. The relays 930 (border relays) may be coordinated with two base stations. The relays 920 and 940 (vertex base stations) may be coordinated with three base stations 910. The cluster 900 may be, for example, a cluster of a 19 cluster wireless communication system.

Each sector 960 may serve one user through its associated relay. The association of the mobile stations 950 to one of the relays 920-940 may be based on least propagation loss criteria. Only the signal-to-noise ratio (SNR) may be required between a mobile station 950 and base stations 910. Full knowledge at one of the relays 920-940 of the link between relays 920-940 and mobile stations 950 may be required to implement zero-forcing (ZF). A throughput gain of 40-50% compared to a no-relay case may be obtained.

Figure 10:
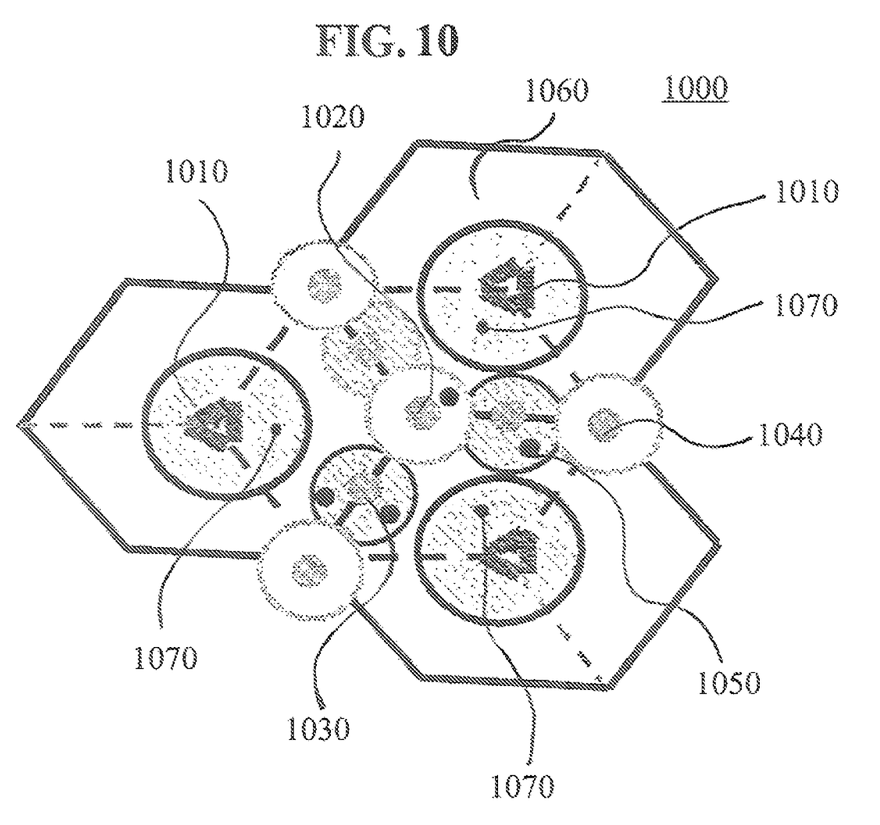
FIG. 10 is a block diagram illustrating a wireless communication architecture according to a still further example embodiment.

FIG. 10 is a block diagram illustrating a wireless communication architecture according to a still further example embodiment. Referring to FIG. 10, a cluster 1000 of a wireless communication system may include base stations 1010, 1 relay 1020, 3 relays 1030, 3 relays 1040 and 3 relays 1070. The relays 1020 and the relays 1040 may be at different 3-sector vertices, and the relays 1030 may be on borders of two sectors 1060 between the relay 1020 and the relays 1040. The relays 1070 may be at a distance of 0.3R (R=sector radius) from a base station 1010. The relays 1070 may be midway towards a 3-sector vertex. The relays 1070 may forward messages while the relays 1020-1040 may forward messages and reduce and/or eliminate interference between sectors 1060. A 55% gain in throughput may be obtained.

The cluster 1000 may be divided into, for example, 9 sectors 1060 and may include a 3-sector vertex. The 3-sector vertex may be a convergence of 3 sectors 1060 (shaded sectors). A different one of the 3 sectors 1060 of the 3-sector vertex may be associated to each base station 910.

Table 1 is a table of example wireless communication architectures according to example embodiments. Table 1 includes gains, in terms of edge rate and average rate, over corresponding baselines for a classical outdoor radio frequency (RF) design of 18 dB reference signal-to noise ratio.

TABLE 1

| Architecture | Antennas per Sector | Number of Relays | Gains in Average Throughput | Gains in Edge Rate |
| --- | --- | --- | --- | --- |
| 1 | 1 | one 1-antenna relay per sector | 17.5% | 278.2% |
| 2 | 6 | two 2-antenna relays per sector | 216% | 124.3 |
| 3 | 1 | one 3-antenna relay per 3 sectors at the vertex | 19.1% | 153.3% |
| 3 | 1 | one 6-antenna relay per 3 sectors at the vertex | 256.1% | 99.5% |
| 4 | 1 | seven 3-antenna relays per 3 sectors: 1 at vertex, other along borders. | 48.6% | 150.3 |

Table 2 is a table of example wireless communication architectures according to example embodiments. Table 2 includes gains in terms of average rate over corresponding baselines for several classical indoor and outdoor scenarios.

TABLE 2

| Architecture | Number of Relays | Classical outdoor RF design: 18 dB | Including 10 dB into the home penetration: 8 dB | Including 20 dB into the home penetration: −2 dB. |
|---|---|---|---|---|
| 2 | two 2-antenna relays per sector | 216% | 151.2% | 103.0% |
| 3 | one 3-antenna relay per 3 sectors at the vertex | 19.1% | 12.4% | 9.7% |
| 3 | one 6-antenna relay per 3 sectors at the vertex | 256.1% | 111.3% | 52.1% |
| 4 | seven 3-antenna relays per 3 sectors: 1 at vertex, other along borders. | 48.6% | 44.7% | 41.9%% |

Figure 11:
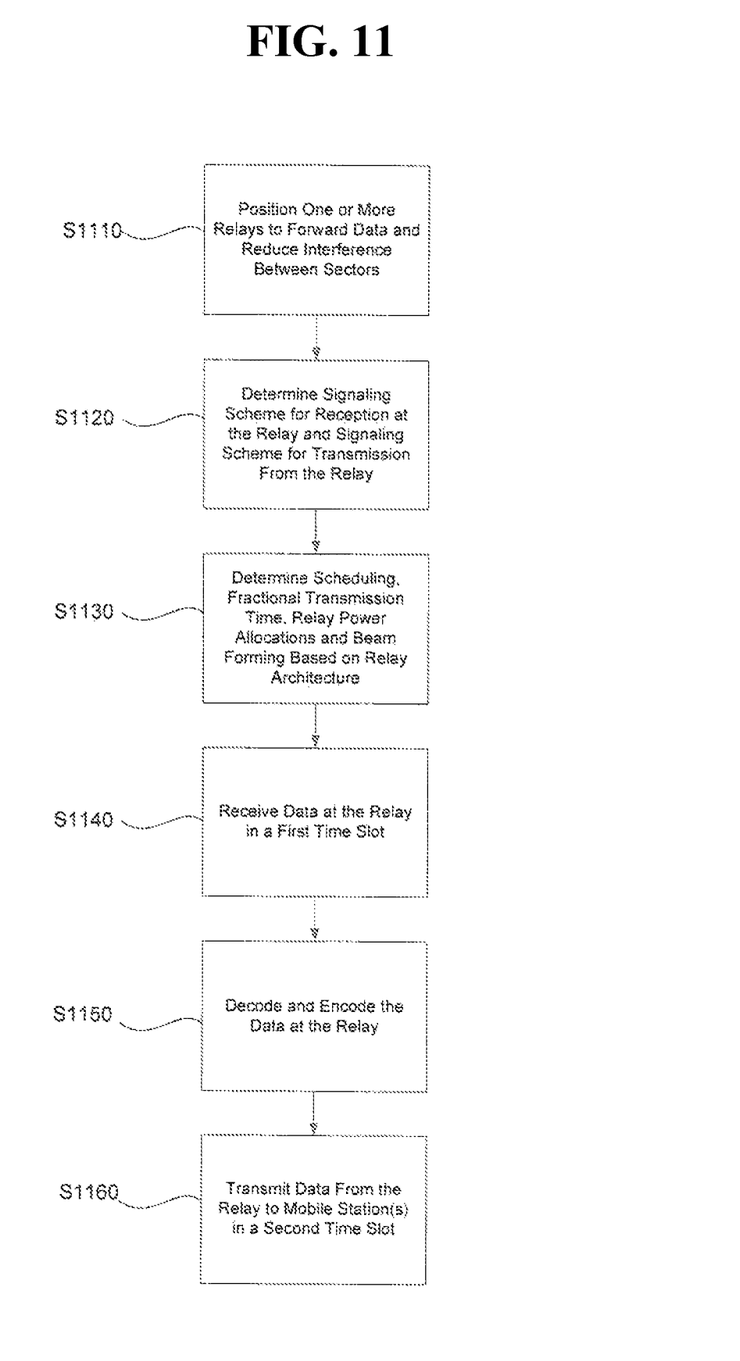
FIG. 11 is a flow chart illustrating methods of configuring a wireless communication architecture according to at least one example embodiment.

FIG. 11 is a flow chart illustrating methods of configuring a wireless communication architecture according to at least one example embodiment. Referring to FIG. 11, one or more relays may be positioned within a wireless communication system to forward data and reduce intra-cell interference between sectors (S1110). The wireless communication system including the positioned relays may be a wireless communication architecture, for example, positioned according to one of the above-described example embodiments.

A signaling scheme may be determined for reception at the one or more relays based on the wireless communication architecture (S1120). A signaling scheme may be determined for transmission from the relay based on the wireless architecture (S1120). Wireless communication parameters may be determined based on the wireless communication architecture (S1130). For example, parameters such as scheduling, fractional transmission time, relay power allocations and beam forming may be determined.

According to example embodiments, data may be received at a relay of the wireless communication architecture in a first time slot (S1140) according to the determined signaling scheme (1120) and wireless communication parameters (S1130). The relay may decode and re-encode the data received in the first time slot (S1150). The relay may transmit the re-encoded data to a mobile station in a second time slot (S1160) according to the signaling scheme for transmission from the relay (S1120) and the wireless communication parameters (S1130). The first and second time slots may be consecutive, orthogonal time slots.

According to example embodiments, relays may be integrated into a wireless communication system (relay architectures) to improve system performance (e.g., throughput and edge rates) and reduce intra-cell interference. Intra-cell interference may be reduced according to, for example, an architecture and a corresponding encoding scheme. For each relay architecture, parameters may be determined (e.g., scheduling, fractional transmission time of interfering nodes, power allocations (bases and relays) and beam forming in the multiple antenna case) such that relays perform both data forwarding and interference cancellation. According to at least one example embodiment, intra-cell interference may be reduced by spatially orthogonalizing mobile stations and determining power accordingly.

According to example embodiments, communication may take place in two consecutive, orthogonal time slots (phases) of the same or different duration. The relative durations of the timeslots may be determined based on the channel conditions. In the presence of multiple interfering half-duplex-relay channels all sources of mutual interference may be taken into account.

In the first time-slot the base station(s) may transmit to relay(s). In the second time-slot the relay(s) may transmit to mobile stations. Relaying within the system may be Decode and Forward relaying, in which a relay decodes a message received from a base station and re-encodes the message for transmission in the second time slot. Both collaborative and non-collaborative schemes may be employed. In non-collaborative Decode and Forward schemes the user may not be active during the first time-slot. In collaborative Decode and Forward schemes the user may accumulate information during base-to-relay transmissions in the first time-slot.

While example embodiments have been particularly shown and described, it will be understood by one of ordinary skill in the art that variations in form and detail may be made therein without departing from the spirit and scope of the claims.

We claim:

1. A wireless communication system, comprising:
at least one first relay configured to forward data received from at least one of a plurality of base stations, and to reduce intra-cell interference between a plurality of sectors of the plurality of base stations, the first relay being at a first 3-sector vertex between the plurality of base stations;
at least one second relay at a second 3-sector vertex including three of the plurality of sectors, and
at least one third relay on a border between only two of the three of the plurality of sectors, the at least one third relay between the at least one first relay and the at least one second relay, each of the two sectors corresponding to a different one of the base stations.

2. The wireless communication system of claim 1, wherein the at least one first relay is connected to each of the plurality of base stations.

3. The wireless communication system of claim 1, wherein the at least one first relay is configured to transmit and receive data according to a joint schedule, the joint schedule coordinating reception by the at least one first relay and communications to at least one mobile station.

4. The wireless communication system of claim 1, wherein the at least one first relay is a 6-antenna decode and forward relay configured to communicate with at least two 3-antenna base stations of the plurality of base stations,
the at least one first relay is configured to receive transmissions from the plurality of base stations in a first time slot,
the at least one relay is configured to transmit to the at least one mobile station during a second time slot in conjunction with the plurality of base stations, and
the first and second time slots are consecutive and orthogonal.

5. The wireless communication system of claim 4, wherein the at least one first relay is configured to receive transmissions from the plurality of base stations on a multiple-access channel in the first time slot and to transmit to the at least one mobile station on a broadcast channel in the second time slot,
the multiple-access channel is implemented using one of zero-forcing beam-forming and minimum mean squared error beam-forming, and the broadcast channel is implemented using zero-forcing beam-forming.

6. The wireless communication system of claim 1, further comprising:
at least one fourth relay midway between at least one of the plurality of base stations and the first 3-sector vertex,
wherein the at least one first relay is one first relay,
the at least one second relay is three second relays, and
the at least one third relay is three third relays.

7. The wireless communication system of claim 1, wherein
the at least one first relay is a 3-antenna decode and forward relay configured to communicate with a plurality of 3-antenna base stations of the plurality of base stations,
the at least one first relay is configured to receive transmissions from the plurality of base stations in a first time slot,
the at least one first relay is configured to transmit to the at least one mobile station during a second time slot, and
the first and second time slots are consecutive and orthogonal.

8. The wireless communication system of claim 7, wherein the at least one first relay is configured to receive transmissions from the plurality of base stations on a multiple-access channel in the first time slot and to transmit to the at least one mobile station on a broadcast channel in the second time slot.

9. The wireless communication system of claim 8, wherein
the multiple-access channel is implemented using one of successive interference cancellation decoding and minimum mean squared error beam-forming, and
the broadcast channel is implemented using zero-forcing beam-forming.

10. A wireless communication system, comprising:
a plurality of relays uniformly distributed in a circular pattern at a distance from a base station, the distance being about half a radial distance between the base station and an outer border of at least one of a plurality of sectors of the base station, wherein
the plurality of sectors is at least three sectors,
the base station includes at least 6 antennas per sector,
the plurality of relays is at least 6 decode and forward relays,
the at least 6 relays are omni-directional, and
each of the at least 6 relays includes at least 3 antennas.

11. The wireless communication system of claim 10, wherein the plurality of relays are configured to transmit and receive according to a joint schedule, the joint schedule coordinating reception of communications from the base station by the plurality of relays and communications to at least one mobile station.

12. The wireless communication system of claim 10, wherein
the at least six relays are configured to receive transmissions from the base station in a first time slot,
the at least six relays are configured to transmit to the at least one mobile station in a second time slot in conjunction with the base station, and
the first and second time slots are consecutive and orthogonal.

13. The wireless communication system of claim 12, wherein the at least one mobile station is three mobile stations.

14. The wireless communication system of claim 12, wherein the at least 6 relays are configured to receive transmissions from the base station on a broadcast channel in the first time slot and to transmit to the at least one mobile station on an interference channel in the second time slot.

15. The wireless communication system of claim 14, wherein the broadcast channel is implemented using one of Dirty Paper Coding and Optimal Linear Pre-coding.

* * * * *